US011255566B2

(12) United States Patent
Forman

(10) Patent No.: US 11,255,566 B2
(45) Date of Patent: Feb. 22, 2022

(54) METHOD AND SYSTEM FOR CHANGING A FLOW RATE OF AIR OUT OF A DUCT IN A HVAC SYSTEM

(71) Applicant: Suncourt, Inc., Durant, IA (US)

(72) Inventor: David J Forman, Coralville, IA (US)

(73) Assignee: Suncourt, Inc., Durant, IA (US)

( * ) Notice: Subject to any disclaimer, the term of this patent is extended or adjusted under 35 U.S.C. 154(b) by 0 days.

(21) Appl. No.: 16/535,422

(22) Filed: Aug. 8, 2019

(65) Prior Publication Data

US 2019/0368764 A1 Dec. 5, 2019

Related U.S. Application Data

(63) Continuation-in-part of application No. 16/249,131, filed on Jan. 16, 2019, now abandoned.

(60) Provisional application No. 62/618,816, filed on Jan. 18, 2018.

(51) Int. Cl.
| | | |
|---|---|---|
| *F24F 11/00* | (2018.01) | |
| *F24F 11/65* | (2018.01) | |
| *F04D 29/66* | (2006.01) | |
| *G05D 23/19* | (2006.01) | |
| *F24D 19/00* | (2006.01) | |
| *F24F 110/10* | (2018.01) | |

(52) U.S. Cl.
CPC ............ *F24F 11/65* (2018.01); *F04D 29/665* (2013.01); *F24D 19/0087* (2013.01); *G05D 23/1902* (2013.01); *F24F 2110/10* (2018.01); *Y02B 30/00* (2013.01)

(58) Field of Classification Search
CPC .................................................. F24F 2110/12
USPC ........................................................ 700/278
See application file for complete search history.

(56) References Cited

U.S. PATENT DOCUMENTS

| | | | |
|---|---|---|---|
| 4,846,399 A | | 7/1989 | Asselbergs |
| 5,350,113 A | * | 9/1994 | Coogan ................. F24F 3/0522 236/13 |
| 5,632,677 A | | 5/1997 | Elkins |
| 7,347,774 B2 | | 3/2008 | Aronstam et al. |
| 7,966,837 B2 | | 6/2011 | El-Galley et al. |
| 8,285,127 B2 | | 10/2012 | Mulder |
| 8,625,976 B2 | | 1/2014 | Mulder |
| 8,787,738 B2 | | 7/2014 | Mulder |
| 8,837,922 B2 | | 9/2014 | Mulder |
| 9,261,283 B2 | | 2/2016 | Mulder |
| 9,723,380 B2 | | 8/2017 | Patel et al. |
| 2007/0119958 A1 | * | 5/2007 | Kates ....................... F24F 11/76 236/1 B |
| 2009/0137199 A1 | * | 5/2009 | Jeung .................... F04D 27/004 454/230 |
| 2011/0031322 A1 | * | 2/2011 | Zou .......................... F24F 11/30 236/1 B |
| 2020/0307352 A1 | * | 10/2020 | Boston ............... B60H 1/00357 |

* cited by examiner

*Primary Examiner* — Suresh Suryawanshi
(74) *Attorney, Agent, or Firm* — Simmons Perrine Moyer Bergman PLC

(57) ABSTRACT

An electric fan powered register booster for a forced air vent in a HVAC system where the booster is configured to stop operation when either of the following events has occurred: 1) the current temperature in the booster has regressed from a recent stored extreme temperature or 2) a predetermined setpoint temperature is between the current temperature and the stored extreme temperature.

18 Claims, 16 Drawing Sheets

HEATING MODE LOGIC

METHOD AND SYSTEM FOR CHANGING A FLOW RATE OF AIR OUT OF A DUCT IN A HVAC SYSTEM

CROSS REFERENCE TO RELATED APPLICATIONS

The present application is a continuation-in-part of the non-provisional application Ser. No. 16/249,131 filed on Jan. 16, 2019 by the same inventor and claims the benefit of the filing date of provisional patent application Ser. No. 62/618,816 filed on Jan. 18, 2018 by the same inventor, which applications are incorporated herein in its entirety by this reference.

FIELD OF THE INVENTION

The present invention generally relates to HVAC fan-forced air register boosters, hereafter "boosters", and more particularly relates to methods and systems for automatically tuning off the same.

BACKGROUND OF THE INVENTION

In the past, such boosters have utilized a thermostatic control which turns a fan in the booster on and off depending upon whether a sensed temperature is above or below a user controlled setpoint with a "deadband" around the setpoint to prevent small instantaneous changes in temperature or intended thermistor behavior from starting and stopping the booster in an undesired manner. The Equalizer Register Booster Fan HC300, available from Suncourt Inc. (www.suncourt.com) has operated in such a manner for many years.

While the Equalizer Register Booster Fan HC300 has enjoyed much success over the years, its design for turning off the booster forces the end-user to choose between a problematic situation at either the beginning or the end of the forced-air cycle of an HVAC system. With a lower setpoint (e.g. just above room temperature), the fan in the booster, hereafter "booster fan", will turn on sooner after the furnace has started and the rise in duct temperature is sensed. But the booster fan will continue to operate long after the furnace has stopped since it will take many minutes for the duct temperature to fall below the setpoint again. This extended run-time can be a nuisance especially since the booster fan, now moving duct air without the assistance of the central air handler, operates against a higher static pressure and the perceivable fan noise is increased. With a higher setpoint (closer to maximum furnace temperature), the booster fan will wait several minutes before turning on, but it will turn off soon after the furnace has stopped. During that extended period of inoperability at the beginning of the cycle, the booster fan is impeding airflow to the room which can exacerbate the very problem of inadequate airflow the booster was designed to address.

Consequently, there exists a need for improved methods and systems for efficiently and easily controlling the operation of boosters.

SUMMARY OF THE INVENTION

It is an object of the present invention to improve the effectiveness of boosters.

It is a feature of the present invention to turn the booster fan off with the aid of information other than a magnitude of deviation of a sensed duct temperature from a setpoint.

It is another feature of the present invention to turn off a booster fan with the aid of information relating to a magnitude of a deviation of a sensed air duct temperature to a maximum or minimum sensed air duct temperature.

It is yet another feature of the present invention to turn off a booster fan with the aid of information relating to a magnitude of a deviation of a sensed air duct temperature to a maximum or minimum sensed air duct temperature or a setpoint crossing characteristic.

It is an advantage of the present invention to avoid inefficiencies resulting from turning off a booster solely based upon a determination of a magnitude of deviation of a sensed duct temperature from a setpoint.

The present invention is carried out in times of minimal ratios off fan noise divided by degree difference, in a sense that occasions of operation during highest noise times combined with lowest degree differences times are eliminated or at least greatly reduced.

Accordingly, the present invention is a method of controlling a booster, comprising the steps of:
  providing an air temperature changing system;
  coupling a duct to said air temperature changing system;
  said duct having an input end and an output end;
  providing at said output end, a means for causing air to move more quickly out of said output end;
  providing a means for sensing a temperature characteristic of air in said duct; and
  wherein said means for causing air to move more quickly is configured to turn off in response to a determination that a predetermined magnitude of deviation has occurred between a current temperature characteristic of air in said duct and one of a maximum stored temperature characteristic and a minimum stored temperature characteristic of air in said duct.

Additionally, the present invention is an improved system for control of air distribution equipment comprising:
  an air temperature changing system;
  a duct having an input end and an output end, where said input end is coupled to said air temperature changing system;
  an electric fan coupled to said output end;
  wherein said electric fan is configured to stop powered operation if either of the following events have occurred:
    a predetermined magnitude of deviation has occurred between a current temperature characteristic of air in said duct and one of a maximum stored temperature characteristic and a minimum stored temperature characteristic of air in said duct; and
    a setpoint temperature for tuning on said electric fan is between said current temperature characteristic and said one of said maximum stored temperature characteristic and said minimum stored temperature characteristic.

BRIEF DESCRIPTION OF THE DRAWINGS

The invention may be more fully understood by reading the following description of the preferred embodiments of the invention, in conjunction with the appended drawings wherein:

FIG. 10 is a mode logic subroutine logic flow diagram.

DETAILED DESCRIPTION

Although described with particular reference to boosters, the systems and methods of the present invention can be implemented in many different types of devices to be used with HVAC systems.

In an embodiment, the system and method of the present invention described herein can be viewed as examples of many potential variations of the present invention which are protected hereunder. The following details are intended to aid in the understanding of the invention whose scope is defined in the claims appended hereto.

Figure 1:
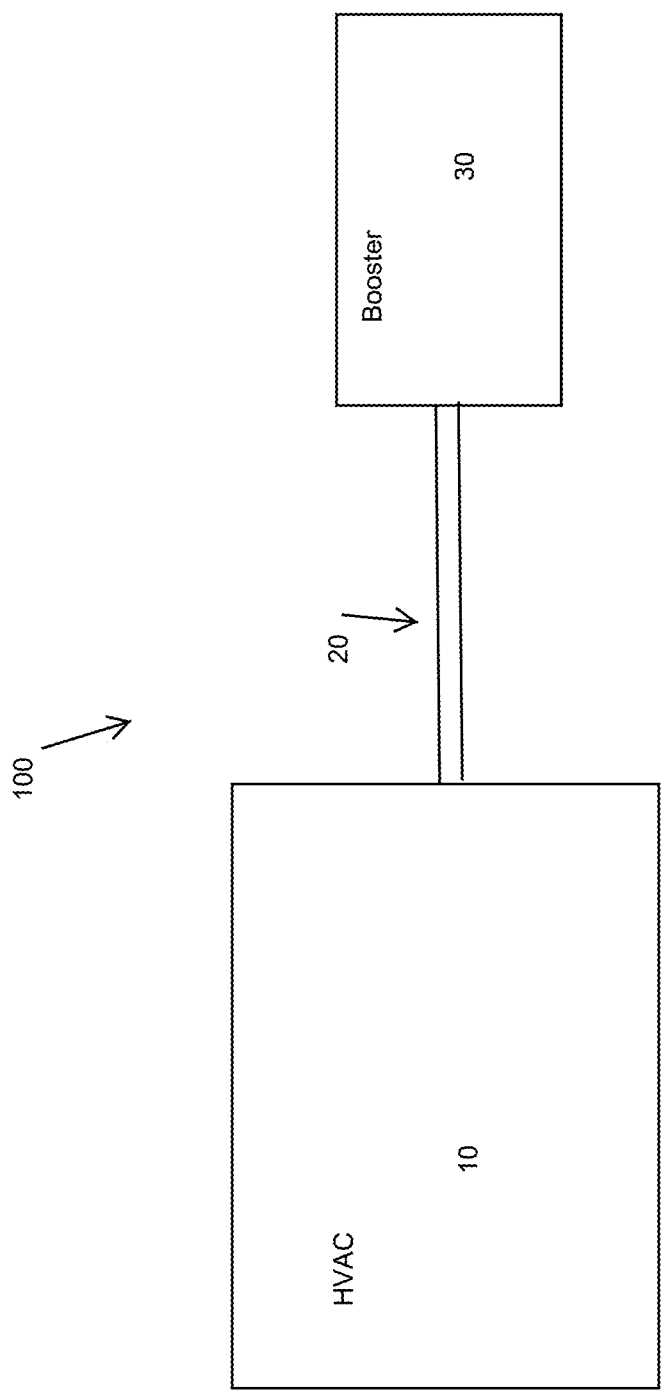
FIG. 1 is a simple block diagram of the system of the present invention.

Now referring to the drawings wherein like numerals refer to like matter throughout, and more particularly in FIG. 1, there is shown a block diagram of the system 100 of the present invention which includes a heating, ventilation, and air conditioning (HVAC) system 10 and a distribution system 20 and a booster 30.

HVAC 10 may be all, any one of, or any combination of a heating system, ventilation system, and air conditioning systems. The present description is focused on a combined HVAC with forced air output. The distribution system 20 would in such an embodiment be an air duct or a system of air ducts. The booster 30 is key aspect of the present invention which may be identical in many ways to the prior art Suncourt HC300 except with novel features relating to control systems for turning of the booster fan 36 (FIG. 2) from an on state to an off state.

Figure 2:
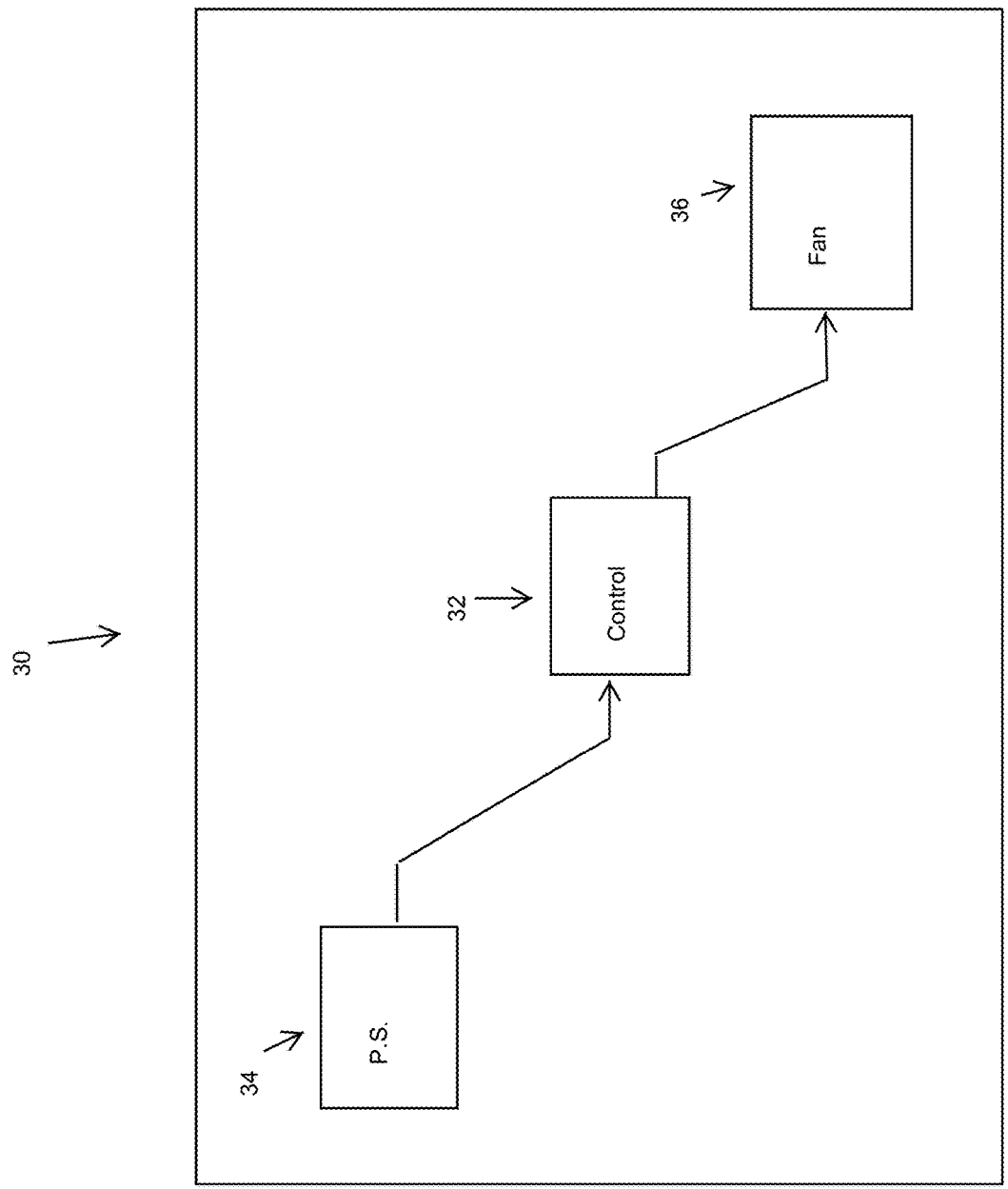
FIG. 2 is a simple block diagram of the booster 30 of FIG. 1.

Now referring to FIG. 2, there is shown a more detailed block diagram of the booster 30 which includes a centrally coupled control system 32, a power supply 34 and at least one electric fan 36.

Figure 3:
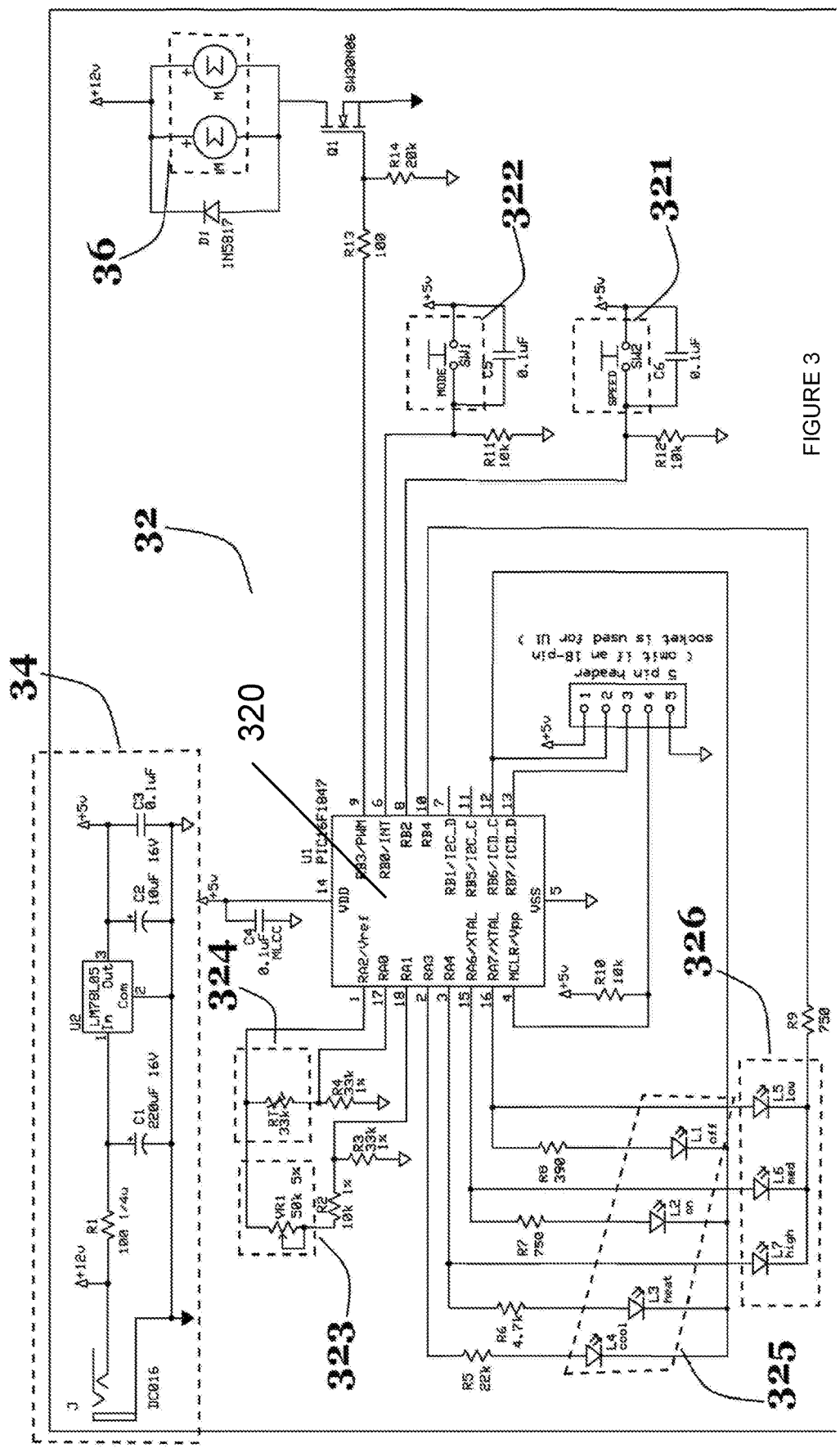
FIG. 3 is a detailed schematic diagram of portions of the system of FIG. 2.

Now referring to FIG. 3, there is shown an electronic schematic diagram of portions of the booster 30 which includes details of booster control 32, power supply 34, and booster fan 36. Booster control 32 can be a circuit card disposed inside of booster 30 and which shown as receiving a 5 v source of power from power supply 34 which also provides a 12 v source of power to booster fan 36. Centrally coupled on the circuit board could be microcontroller unit 320, coupled to the microcontroller unit 320 is a first user interactive button 321 and a second user interactive button 322, as well as a user interactive setpoint adjuster 323, which could be a rheostat or other rotary knob or a suitable substitute. Also coupled to microcontroller unit 320 is airflow temperature sensing thermistor 324 which is placed in a position to determine the temperature of the air exiting the distribution system 20 into the booster 30. Also coupled to microcontroller unit 320 is an array 325 of LED mode indicators such as heat, cool, on and off and an array 326 of LED fan indicators which indicate the speed low, medium and high. Also shown in FIG. 3 is the electronics involved in the booster fan 36 which receives its power from power supply 34 but receives a control signal from microcontroller unit 320. In an alternate embodiment of the present invention, the array 325 of LED mode indicators is replaced with a single LED which is capable of displaying different colors depending upon the applied voltage to each pin. Similarly, the array 326 of LED fan indicators could be replaced with a similarly functioning single LED, or a quantity of LEDs greater than 3. In an embodiment where the adjustability of the width of the deviation is important, a third button or a suitable substitute could be added, together with concomitant changes in flow diagrams and associate code. In such embodiment, one pin of said microcontroller unit could be an input for different voltages corresponding to different width characteristics.

Figure 4:
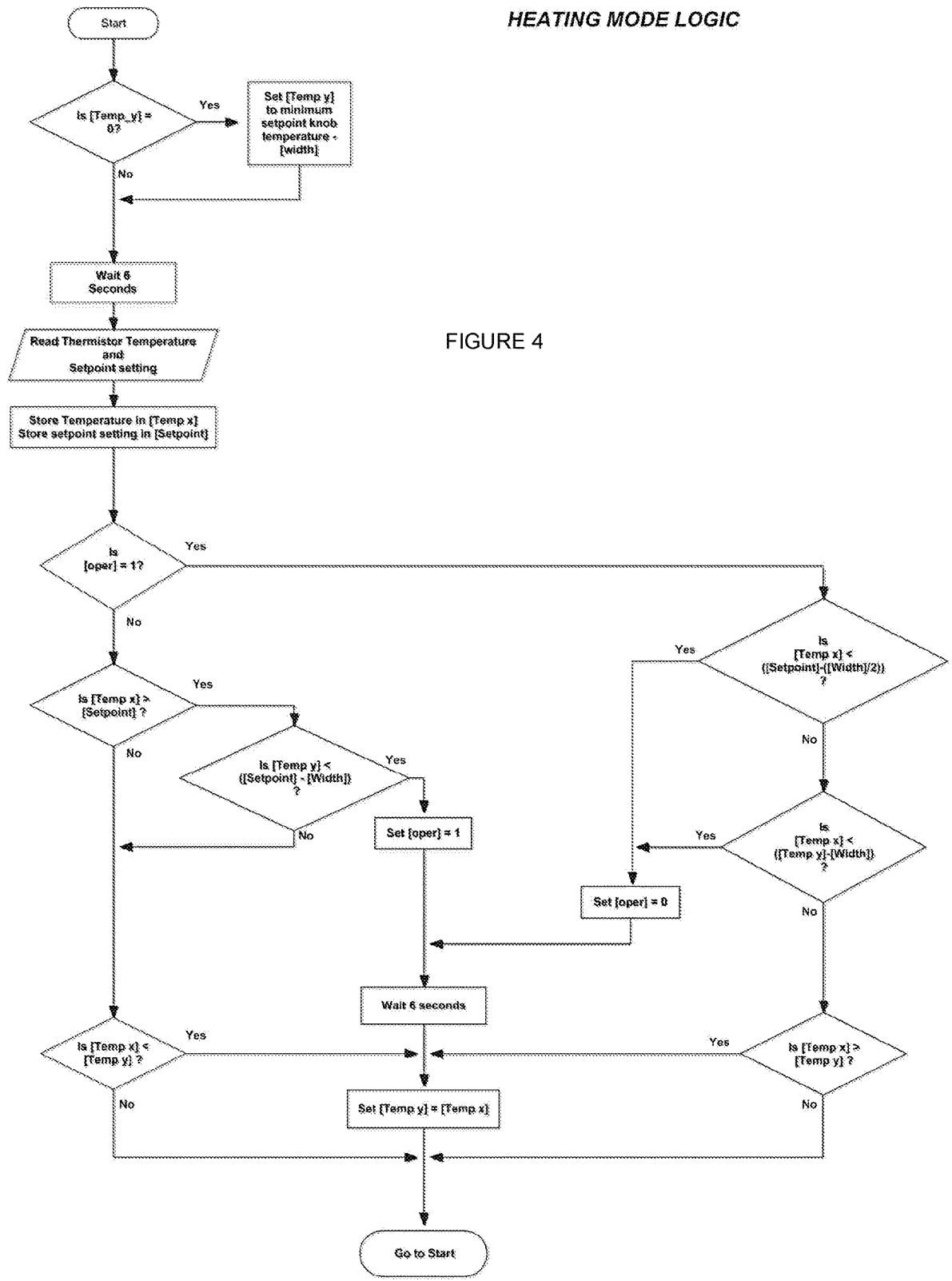
FIG. 4 is a heating mode logic flow diagram.

Now referring to FIG. 4, there is shown a flow diagram which explains the details of the novel method of the present invention in the heating mode context. Our method is to sense the temperature of the duct and use the comparison to setpoint as the means to turn the unit on. This is well known in the prior art. However, our new method relies on deviation from max/min temperature as the primary means of turning the unit off. However, it also includes setpoint crossing as a secondary means of turning the unit off in case the primary method fails (for situations outlined above). Since the temperature at the moment the unit turns off after a deviation from min/max would typically be in range of a setpoint "start" comparison, the unit would, without additional logic, just turn right back on. To again use the heating mode as an example, assume that starting duct temperature is 72° F., setpoint is 80° F., max duct temperature is 92° F., and the deviation is a fixed 4° F. When the temperature rises above 80° F., the unit will turn on. The temperature will eventually reach 92° F. at the apex of the furnace cycle. Once the furnace stops and the duct temperature drops, the unit will turn off once the temperature has deviated 4° F. from max or 92−4=88° F. At that moment, the 88° F. temperature is above the setpoint of 80° F. and the unit will start again even though the furnace isn't running We have included additional logic in our method that will prevent this situation. After a cycle has ended, the temperature must drop below the setpoint before a 'rise above setpoint' can trigger the unit to start again.

Our method does not "learn" the heating or cooling pattern over many cycles and store that data indefinitely. Instead, it employs two stored variables that are re-sampled and overwritten by logic every 6 seconds. One variable, referred to as Temp_x in our flow diagrams, represents the recent sampled temperature and is overwritten every sample. The second variable, Temp_y, is a stored temperature. The value of Temp_y is either overwritten with the value of Temp_x every sample cycle or it is held according to our logic. Again to use heating mode as the example, Temp_y will be overwritten by Temp_x any time Temp_x is lower than Temp_y during non-operation, otherwise it will continue to hold its value until the next sample cycle. Temp_y will eventually represent the value of the minimum peak temperature. Once the duct temperature (Temp_x) is above the setpoint, the unit is in operating mode (booster fan is operating). Temp_y is no longer held and the sample-and-hold logic is reversed. Temp_y will now be overwritten by Temp_x any time Temp_x is higher than Temp_y, otherwise it will continue to hold its value until the next sample cycle. Temp_y will eventually represent the value of maximum peak temperature. Once the temperature deviates by a fixed amount ("Width" variable according to our diagram) below the peak temperature, the unit will enter non-operating mode and the conditional sample-and-hold logic that manages the value of Temp_y will again revert to the methods in the non-operating region. So this conditional sample-and-hold logic allows the Temp_y variable to "find" the maximum and minimum duct temperatures for each cycle.

It is this cycle-specific conditional sample-and-hold peak detection method of temperature sensing that sets us apart from prior patents. And the inclusion of a temperature setpoint adjustment in our method simplifies the required programming, prevents false detection of a 'cycle start' condition, and allows for secondary detection of a 'cycle end' condition in unusual operating circumstances. This hybrid method of temperature setpoint and conditional sample and hold peak detection doesn't require any 'calibration' cycles or aggregated historical data in order to effectively execute synchronization. We are not collecting and storing data about each cycle to determine a "profile" of the duct temperature curve. We are only concerned with the minimum and maximum temperatures and the current temperature relative to the setpoint for each cycle.

The end-user installs the register booster (or other apparatus using our temperature sensing method described herein) in its proper place within the existing duct system. For heating mode, the end-user begins with a setpoint at the maximum temperature value. Once the furnace system starts after a call from the household thermostat, the end-user waits a period of time for the duct temperature to begin to increase above ambient room temperature. Then the end-user begins to adjust the setpoint down from maximum. The booster fan will start and this is an indication to the end-user that they have completed their setpoint adjustment. Since a period of time elapsed between the start of the furnace cycle and the completion of setpoint adjustment, it can be inferred that the actual setpoint temperature is several degrees above the duct temperature at the start of the cycle, which is presumed to be close to the ambient room temperature. The end-user will observe that the booster fan will cease operation shortly after the end of the furnace cycle. This is confirmation that the logic has entered non-operation mode after sensing a deviation from maximum temperature or determining the secondary (fail-safe) condition of a drop below setpoint temperature. The booster will automatically start the next time a furnace cycle is initiated (as determined by the household thermostat). After this first forced air cycle in which the end-user has made their setpoint adjustment, the booster will continue to repeat this synchronization behavior without any additional delay or intervention from the end-user. Once cooling season has started (household thermostat is calling for air conditioning instead of heating), the end-user will select cooling mode on the booster unit and once again make their setpoint adjustment once for the season.

Electronic Component Description

To build an effective control to carry out this logic, there are several factors to consider.

Although not impossible, using discrete logic IC's to accomplish this behavior has many complications and can be expensive in terms of part count. Mode and Fan Speed selection momentary button presses and their "ring counter" behavior can be handled each by one ½ of a CD4015 shift register, two sections of a CD4069 hex inverter, and many signal diodes. Even the fan speeds can be set up by using two more sections of CD4069 to form a triangle wave oscillator of fixed frequency fed to the + pin of one section of an LM324 quad operational amplifier set up as a comparator. The − pin of this comparator is connected to a network of voltage dividers using a common resistor to ground. Each output of the CD4015 section for fan speed would use a different resistor value to this voltage divider, thus changing the threshold of the comparator at each fan speed setting. This would set up a square wave output on the comparator whose duty cycle is dependent on the output logic state of the CD4015 section controlling fan speed. The comparator's PWM output could drive the fan(s) via a transistor or other high-speed switching device. At this point, we have employed three different discrete integrated circuits and a multitude of supplementary diodes, resistors, and capacitors and the heating and cooling logic has not yet been addressed. Notwithstanding the fact that dedicated 'sample and hold' IC's are not designed to hold voltages over the length of time required for this application, this discrete IC approach is obviously not an economical one. We can then surmise that the best way to accomplish this logic is via a programmable microcontroller chip, such as microcontroller unit 320. The microcontroller, setpoint potentiometer, such as user interactive setpoint adjuster 323, thermistor temperature sensor, such as airflow temperature sensing thermistor 324, and pushbuttons, user interactive button 321 and user interactive button 322 are the critical components in terms of the circuit logic. There are two ways in which a microcontroller can measure the temperature and setpoint.

A microcontroller without dedicated ADC (analog-to-digital) decoder pins can be used, although there are certain considerations that need to be taken. Without an ADC, the microcontroller can measure the thermistor temperature and setpoint (both resistive measurements), by using a pin to charge a capacitor via either the thermistor or setpoint potentiometer. Either is effectively a simple RC network. A second pin on the microcontroller between the capacitor and resistive element can measure the voltage on the capacitor as it charges. Since the measurement pin can only detect the logic state (on or off) of the input, the microcontroller must determine the time it takes from the introduction of power to the RC network to the time the logical "high" threshold is reached on the pin. By recording this time-constant (or a multiple thereof), the microcontroller can calculate the resistance since the capacitor is a fixed value. With this method, it is critical that the capacitor is of a type that is not susceptible to a change in value as the temperature shifts as this would lead to errors in the microcontroller measurement. A capacitor with a class 1 NP0 rating and an EIA letter code of C0G, will retain a constant capacitance value irrespective of temperature or voltage and will give the RC network the stability it needs to function properly.

A microcontroller with dedicated ADC pins can directly measure the voltage across both the thermistor and setpoint potentiometer if each is part of a voltage divider fed by a constant voltage source. Some microcontrollers provide their own internal constant voltage source available to one or more output pins for such purposes.

In both methods described above, the power regulation of the circuit and the selection of the thermistor are critical factors. The power source should be stable and unaffected by the introduction or change in state of the booster's fan(s).

The microcontroller itself should have good decoupling from the power rails via a capacitor in close proximity to its power pins to lower the introduction of noise into the chip and also to lower noise emitted by the chip to other elements of the circuit.

An NTC (negative temperature coefficient) thermistor is the most commonly available type of temperature sensor. As the name suggests, its resistance will increase as the temperature decreases. Thermistors are rated according to their resistance at 25° Celsius (77° Fahrenheit). Thermistors are inherently non-linear devices in that their resistance-to-temperature ratio increases with a fall in temperature. This effect can either be compensated in the microcontroller's programming, or used to the benefit of the logic. In the latter case, if a specific shift in temperature is an actionable event to the logic, then the microcontroller would regard the corresponding shift in thermistor resistance (or voltage) with the same specificity. If that same specific shift is used in both heating and cooling modes, it allows for a universal implementation of the logic with regards to said shift. For example, a shift of 2200 ohms in thermistor resistance might represent a change of 6° F. when the temperatures are at or above 85° F. Due to the non-linearity of the thermistor, a shift of 2200 ohms might only represent a change of 3° F. when the temperatures are at or below 65° F. This is beneficial for the logic since the change in temperature over a complete furnace cycle can often be twice as large as the change in temperature during an air conditioning cycle. Using a universal value for this shift in the programming will inherently match the temperature characteristics of a forced-air system.

An NTC thermistor also has ratings for maximum power dissipation (mW), self-heat (mW° C.), and time constant T in seconds. When using a thermistor in a voltage divider to an ADC input on the microcontroller, care must be taken in the selection of the fixed resistor's value such that the power dissipation across the thermistor is kept to a minimum. So too with the selection of reference voltage for the RC method of thermistor measurement. Keeping the power dissipation low will also lower the self-heat of the thermistor. The self-heat will lead to errors since it will also introduce error into the microcontroller measurement. Choosing a time constant that is too fast (≤5 seconds) could result in false triggering of the circuit, while choosing a time constant that is too slow (≥15 seconds) will add an unnecessary lag in the response time of the booster fan.

Thermistors also have a $B^{25}/_{50}$ rating which helps to identify the shape of the exponential resistance vs. temperature curve. While the initial selection of this value is not critical, it is important that any alternative thermistor chosen as a replacement to the thermistor in which the design parameters of the microcontroller programming were built upon. The same is true of the other ratings mentioned above.

Perhaps, the most important characteristic of a thermistor in a register booster is its response to airflow. The response time and data tables listed in the thermistor's data sheet are often measured in an oil bath. When some thermistors are exposed to the flow of air, their resistance will increase. This phenomenon is not published on the thermistor's datasheet, so the suitability of a particular thermistor must be tested experimentally. This change in thermistor response can wreak havoc on the microcontroller's otherwise satisfactory handling of the logic. In heating mode, when the microcontroller detects furnace temperatures and activates the booster's fan(s), a thermistor prone to airflow shift will show a sharp and sudden increase in resistance. The microcontroller will interpret this as a drop in temperature. If the shift is sufficiently large, it can, under certain circumstances, cause the microcontroller to cease the operation of the booster fan shortly after activation. A smaller shift will also impart error into the temperature measurement, but this error will persist throughout the boosted operation and should not affect the measurement of maximum and deviation temperatures with respect to one another. But in the instant the booster fan turns off, the thermistor's natural tendency to rise in resistance as the temperature is falling will be counteracted by the thermistor's inclination to lower its resistance now that the airflow has ceased. This can prevent the booster fan from starting on subsequent cycles according to our logic schema.

Logic Overview

Figure 5:
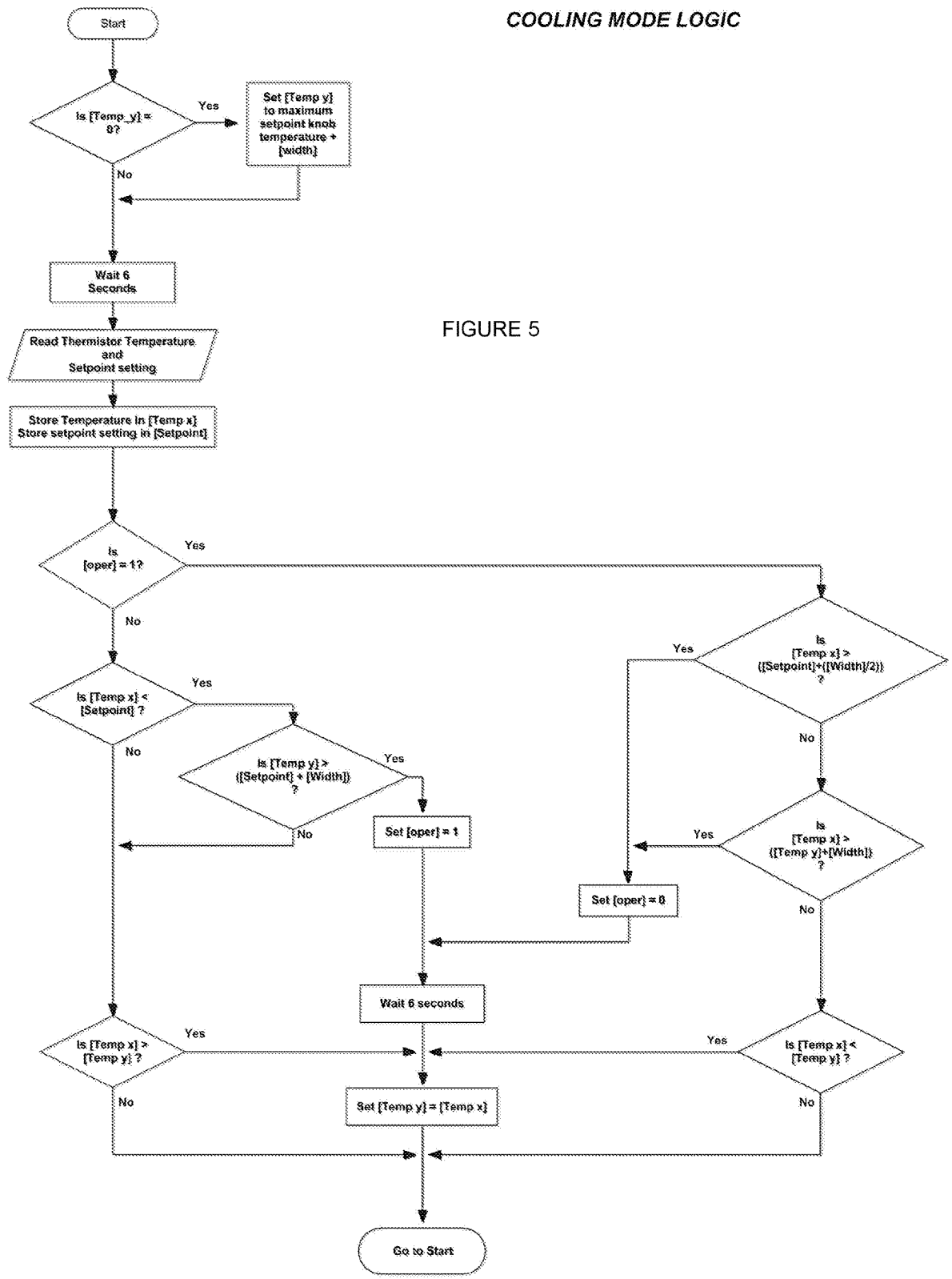
FIG. 5 is a cooling mode logic flow diagram.

The logic is divided into seven sections. A Main routine (FIG. 6) runs on an indefinite loop and handles the basic functions for returning from power loss or initialization. A Mode Button Press interrupt subroutine (FIG. 9) handles the de-bouncing of the mode button and iterates the logic modes in a ring counter configuration. A Mode Logic subroutine (FIG. 10) controls the user feedback and either runs the fans continuously or starts the selected Heating (FIG. 4) or Cooling Logic loop (FIG. 5). The Fan Speed Button Press interrupt subroutine (FIG. 7) handles the de-bouncing of the fan speed button, determines the visibility of the fan speed indicator lights, and calls the Fan Speed Logic subroutine (FIG. 8). The Fan Speed Logic subroutine sets the duty cycle of the booster's fan(s) and illuminates the indicator light associated with the selected speed. Fan speeds are iterated by a ring counter configuration. The Heating Mode Logic routine determines the operational status of the booster fan(s) according to the temperature conditions and setpoint. It runs on an indefinite loop until interrupted by a button press interrupt routine. The Cooling Mode Logic routine also determines the operational status of the booster fans according to the temperature conditions and setpoint, but the logic is reversed. It too runs on an indefinite loop until interrupted by a button press interrupt routine.

There are several possible embodiments of this invention. Each treats the logic of the heating mode and cooling mode equally and thus utilizes the cycle-specific sample-and-hold peak detection method described herein. The embodiments differ in the user's interaction with the controls and the layout thereof. In the first embodiment, the operating mode is selected by a tactile push-button and confirmed to the user with an LED for each mode. The fan speed is selected by a tactile push-button and confirmed to the user with an LED for each fan speed. One LED is lit at a time to represent the fan speed as noted on the product control panel label. A mechanical rotary knob is used for the temperature setpoint. In the second embodiment, the operating mode is selected by capacitive or resistive touch pads and confirmed to the user with a single multicolored LED, each color or combination thereof representing the selected mode. The fan speed is also selected by capacitive or resistive touch pads and confirmed to the user with LED's. One or more fan speed LED's may be lit at a time to represent the selected speed relative to 100% (all fan speed LED's lit) and the number of speeds is not limited to three. This second embodiment simplifies the control layout, lowers the part count, eliminates the moving or movable parts from the molded polymeric front housing that would otherwise interface mechanically with the PCB, and reduces the necessity for explanatory verbiage or symbols on the control panel label. This second embodiment would also use a rotary knob for the temperature setpoint.

Logic Flow Diagrams—Overview of Variables

Now referring to the flow diagram drawings. The flow diagrams incorporate several variables that are stored in the microcontroller's memory or read by the microcontroller in real-time. [Mode] refers to the operating mode of the unit. This is an integer variable in which 0 represents "off" or no operation, 1 represents "on" or continual fan operation irrespective of temperature, 2 represents "heat" mode or "make on rise" for heating season temperature-controlled operation, and 3 represents "cool" mode or "make on fall" for cooling season temperature-controlled operation. [Oper] is a Boolean variable representing the state of the unit's fan(s). A value of 1 represents that the fan(s) is/are operational (regardless of speed), and a value of 0 represents that the fan(s) is/are not operational. [Speed Lights] is another Boolean variable in which the visibility of the LED's representing fan speeds is set. A value of 1 enables the speed LED's and a value of 0 disables the LED's. The selected fan speed is neither visible to nor selectable by the end-user when the unit is off. [Temp x] is a float (integer with decimal) value representing the sampled temperature of the thermistor. [Temp y] is also a float value representing the stored temperature that is either held, overwritten, or reset by the logic. [Width] is a float value representing a fixed change in temperature, the value of which may not necessarily be universal to both heating and cooling modes. For the purposes of illustration, we will consider [Width] in heating mode to represent a change of 6° Fahrenheit and [Width] in cooling mode to represent a change of 4° Fahrenheit. The [Speed] variable is an integer value representing the current fan speed setting. In the first embodiment, values of 0, 1, and 2 represent "high", "medium", and "low" fan speeds, respectively. In the second embodiment, values begin with 0 to represent the lowest speed. The highest speed is represented by a [Speed] value 5. Speed settings between low and high are proportioned equally between the lowest and highest fan speed. In both embodiments, it is assumed that the highest speed is equivalent to 100% duty cycle. However, the choice of fan(s) for the unit could require a "high" speed that is not necessarily 100% in cases where noise and performance must be managed effectively. So we will refer to the "high" speed PWM duty cycle as "full speed" in the following descriptions.

Logic Flow Diagrams—Detailed Descriptions

Figure 6:
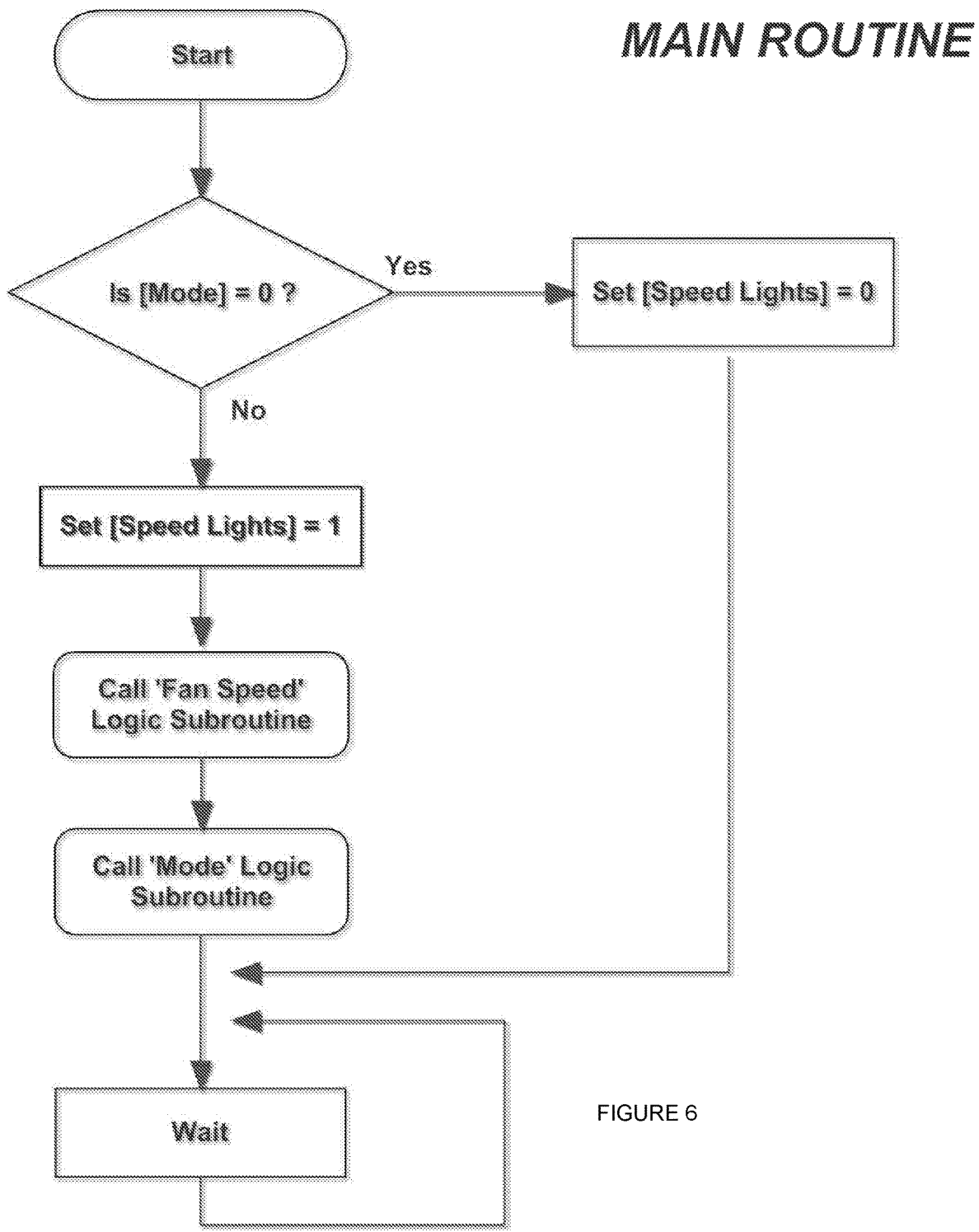
FIG. 6 is a main routine logic flow diagram.

FIG. 6 shows the Main Routine. The microcontroller should store the values of [Mode] and [Speed] variables in non-volatile memory. The start sequence in the logic diagram begins when the unit first receives power. If the unit has never been operated prior, the value for [Mode] will be initialized to 0 or "off". If the [mode] is equal to 0, then the [speed lights] parameter should be 0 as well to disable the indication of fan speed. This would also be the case if the unit loses power while [Mode]=0 and is powered on again. If it is determined that the [Mode] parameter is 0, the Main Routine will wait in an indefinite loop until an interrupt subroutine is called by a mode button press. Otherwise, if the [Mode] value is >0, the Fan Speed Logic Subroutine should be called to re-initialize the fan speed from memory and the [Speed Lights] should be set to 1 to enable indication. Then the Mode Logic Subroutine should be called to restore the previous operational mode setting. With a [Mode] parameter >1 on power-up, the Main Routine would never reach the indefinite loop since the Mode Logic Subroutine would start either the Heating Mode Logic or Cooling Mode Logic, either of which themselves run on their own indefinite loop awaiting an interrupt call.

Figure 7:
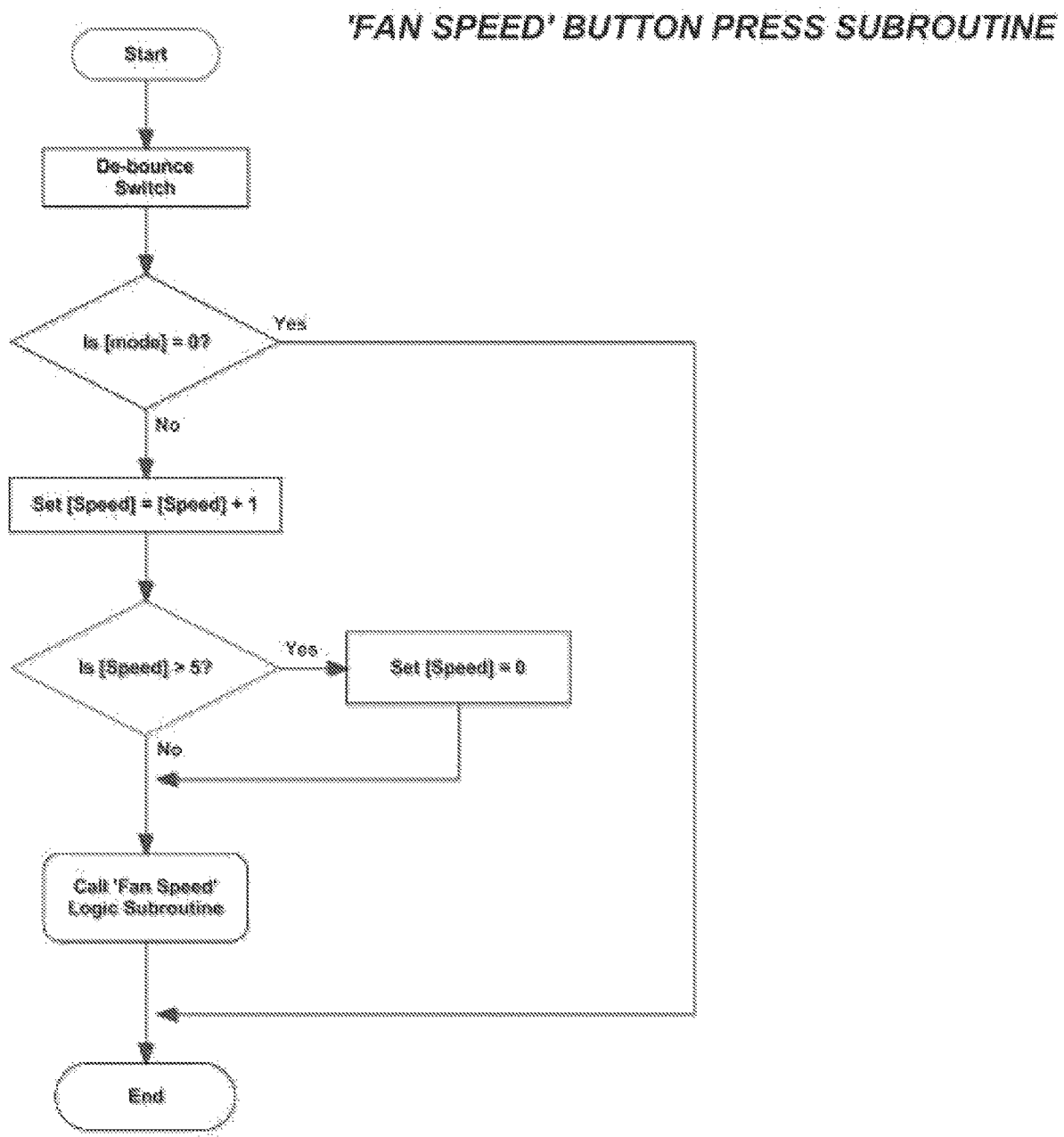
FIG. 7 is a fan speed button press subroutine logic flow diagram.
Figure 8:
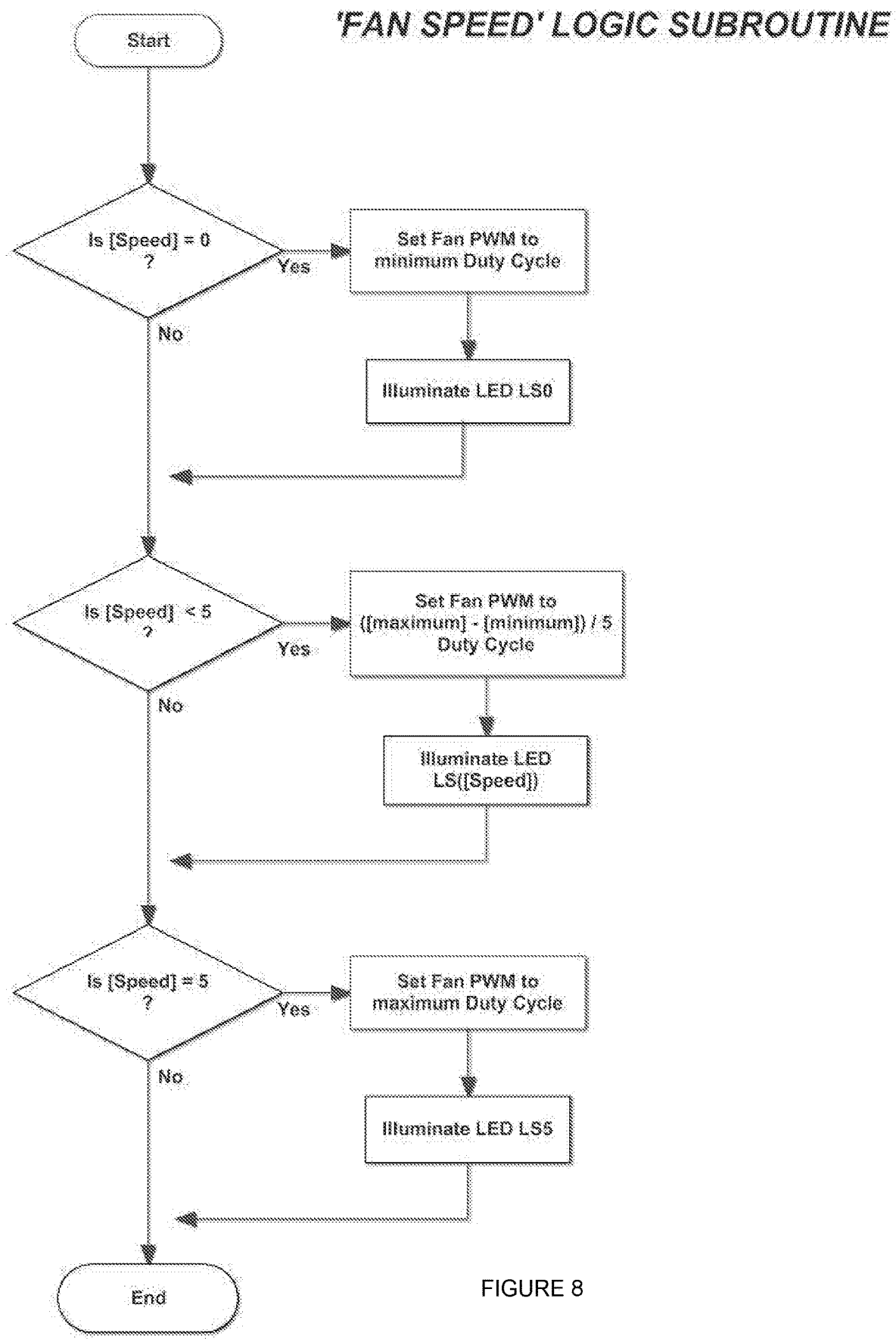
FIG. 8 is a fan speed subroutine logic flow diagram.

FIG. 7 shows the Fan Speed Button Press Subroutine for the first embodiment of this invention. This is an interrupt routine that will exit execution of any code otherwise operating in an indefinite loop. Upon completion of this subroutine, the code execution will return to the previous subroutine and continue from the point at which it was interrupted. The Fan Speed Button Press Subroutine begins by de-bouncing the fan speed button. Any mechanical momentary switch will present a series of erratic electrical pulses when pressed. These pulses can last only milliseconds, but to any logic-level input device (microcontroller or otherwise), these pulses can be misconstrued as repetitive button press events. These pulses can be mitigated by placing a capacitor across the switch and a resistor at the junction of switch and microcontroller input to ground thus forming a simple RC low-pass filter. Since we are already employing a microcontroller in this circuit, we can eliminate these additional components by de-bouncing the switch with code. The code would employ a timer to ignore further input from the switch pin for a specified interval once a logic high is first detected on the pin. After de-bouncing the switch, the code then examines the value of the [Mode] parameter. If 0 (off), then no further code is executed. Pressing the fan speed button while the unit is off will have no effect on the setting. If the [Mode] is >0, then the [Speed] parameter will be incremented by 1. If the highest possible value for [Speed] has been exceeded by this increment command, then the [Speed] parameter is set to 0 to re-start the sequence. This is effectively a ring counter methodology. Once the new fan speed setting has been established, the Fan Speed Logic Subroutine is called. After the Fan Speed Logic Subroutine finishes execution, the Fan Speed Button Press Subroutine ends.

Figure 11:
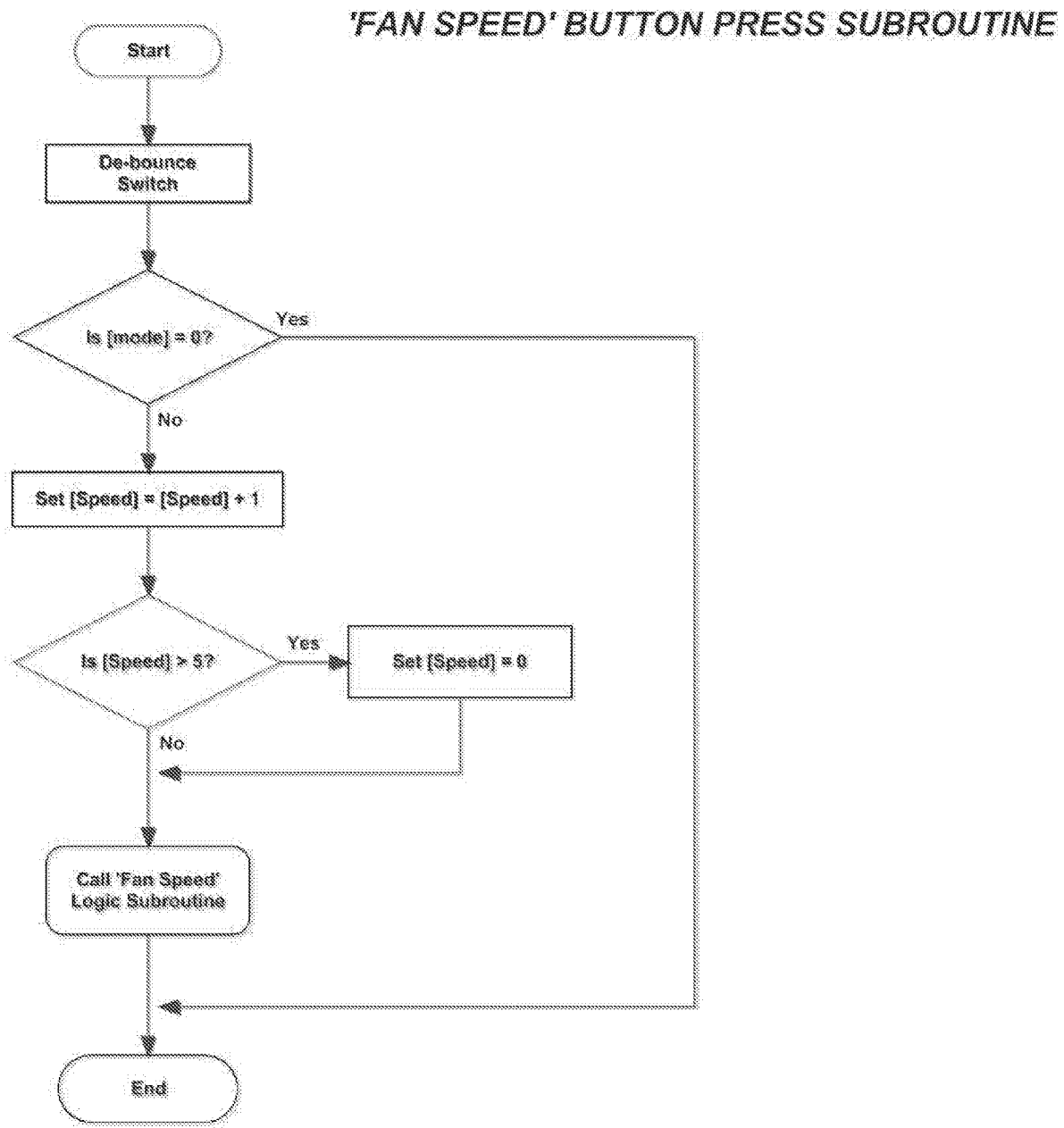
FIG. 11 is a fan speed button press subroutine logic flow diagram of an alternate embodiment.

FIG. 11 shows the Fan Speed Button Press Subroutine for the second embodiment of this invention. It is functionally equivalent to the logic diagram shown in FIG. 7, but there are more fan speeds to select.

FIG. 8 shows the Fan Speed Logic Subroutine for the first embodiment of this invention. This subroutine is called either from the Fan Speed Button Press Subroutine, or from the Main Routine during initialization. In the former case, the [Speed] parameter is set by the Button Press Subroutine. In the latter case, the [Speed] parameter is recalled from memory during initialization. A [Speed] value of 0 represents full speed or maximum duty cycle. A value of 1 represents medium speed, and a value of 2 represents low speed. Since the button press event increments the value of [Speed] in a positive direction, the speed selections are presented to the end-user as 'high'->'medium'->'low'->'high'->'medium'->'low', etc. . . . The selected speed is shown by the corresponding LED which will remain lit until either the fan speed is changed, or the [Mode] parameter is <1. After the Fan Speed Logic finishes execution, it returns to the routine from whence it was called.

Figure 12:
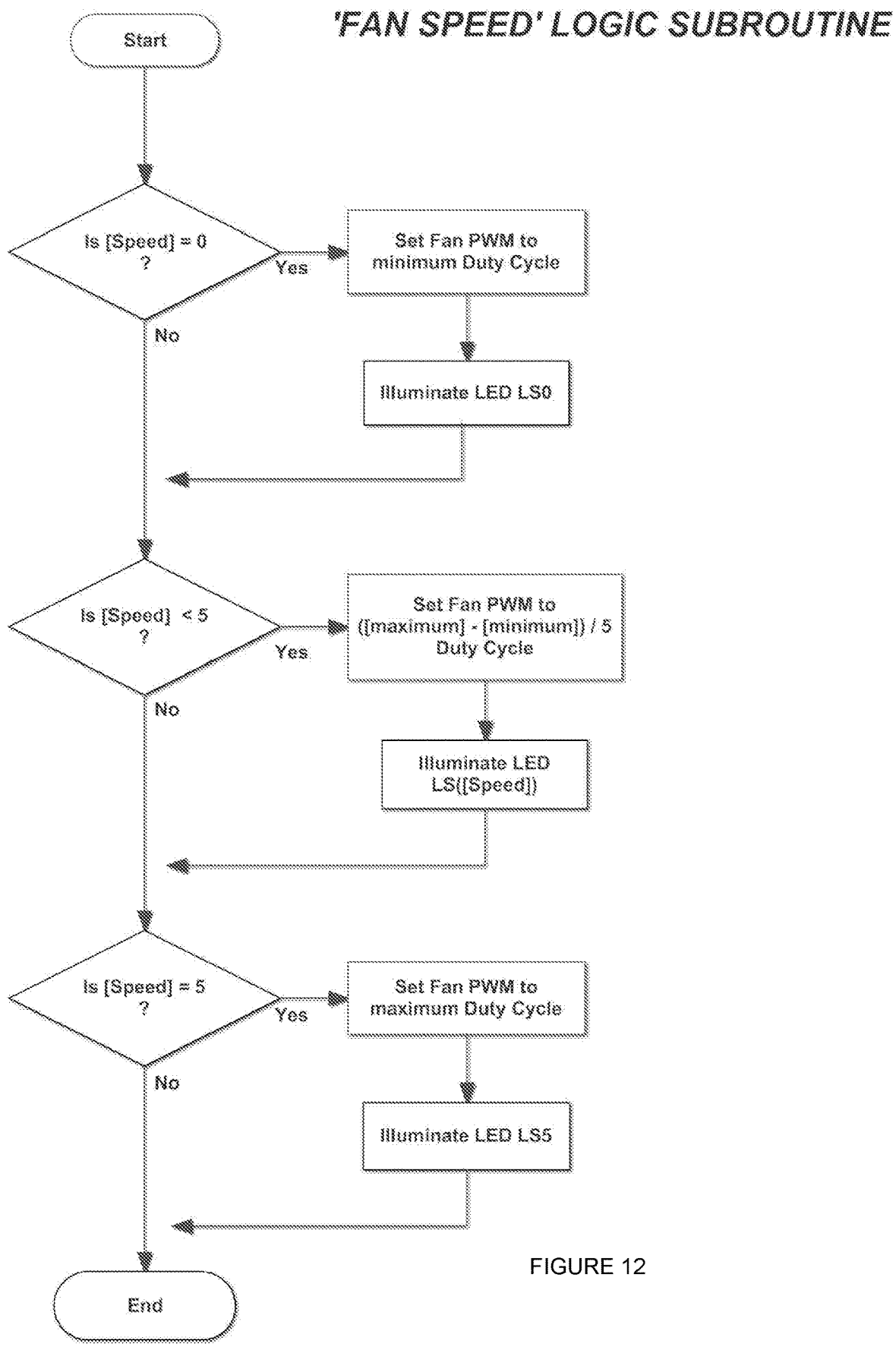
FIG. 12 is a fan speed logic subroutine logic flow diagram of an alternate embodiment.

FIG. 12 shows the Fan Speed Logic Subroutine for the second embodiment of this invention. It is called by and returns to the same subroutines as noted in the paragraph above. Its LED indicators will persist in the same manner described in the paragraph above. Opposite of the first embodiment, this routine will iterate the fan speeds from low to high. So a [Speed] parameter value of 0 will represent the low speed and a [Speed] parameter of 5 will represent high speed or maximum duty cycle. [Speed] values between 1 and 4 will be proportionally allocated between low and high speed.

Figure 9:
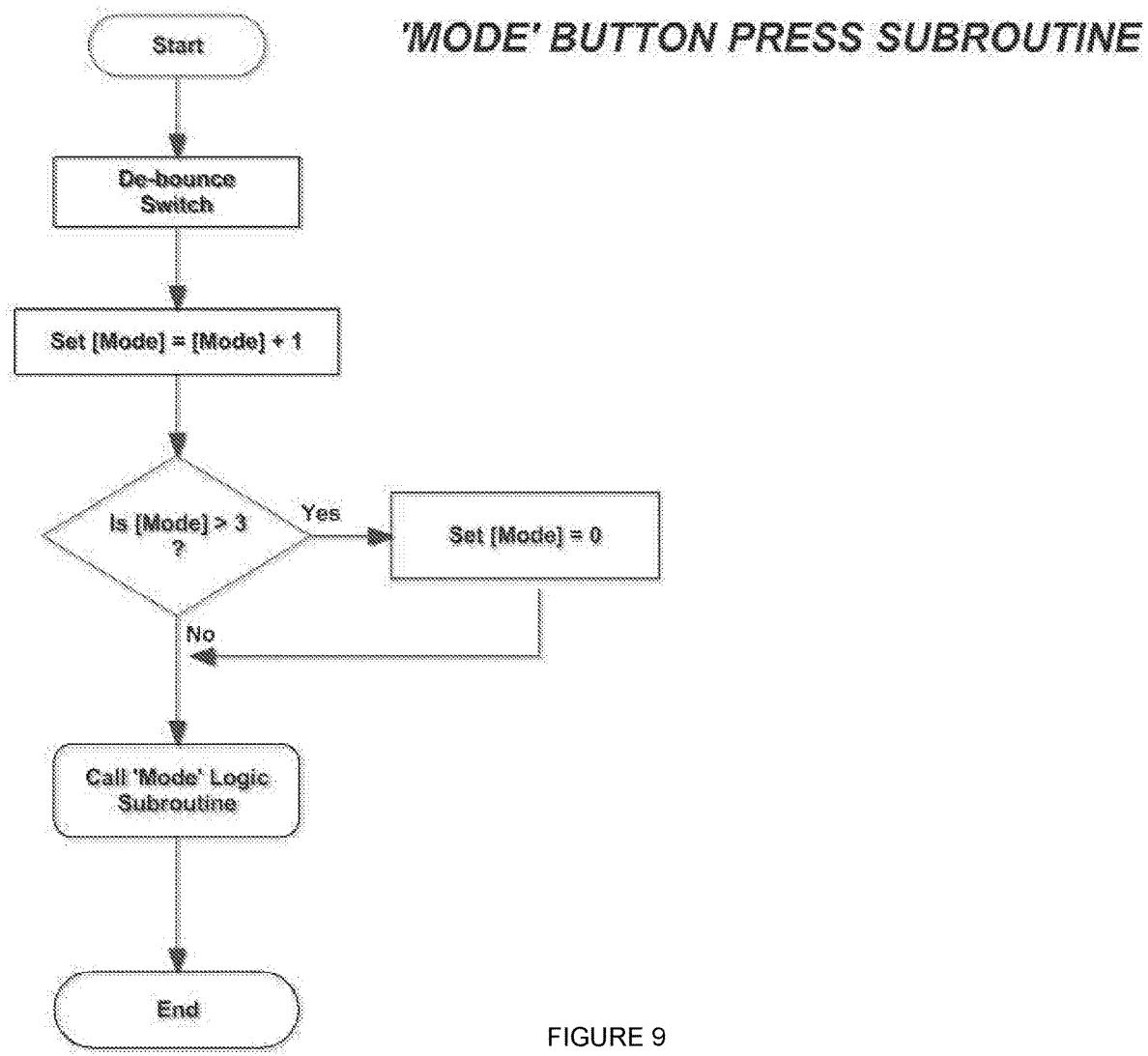
FIG. 9 is a mode button press subroutine logic flow diagram.

FIG. 9 shows the Mode Button Press Subroutine for both embodiments of this invention. Like the Fan Button Press Subroutine, this too is an interrupt routine that will exit execution of any code otherwise operating in an indefinite loop. Upon completion of this subroutine, the code execution will return to the previous subroutine and continue from the point at which it was interrupted. As with the Fan Button Press subroutine, the Mode Button Press Subroutine begins by de-bouncing the mode button. It then increments the [Mode] parameter from 0 to 3 in a ring counter configuration. With the new mode selected, this subroutine then calls the Mode Logic Subroutine before ending execution and returning to the routine from whence it was called if the [Mode] value is <2. If the [Mode] value is set >1 prior to calling the Mode Logic Subroutine, then the Mode Button Press Subroutine will never complete execution. This is because [Mode] values of 2 or 3 represent heating or cooling mode. When the Mode Logic Subroutine is executed, it will start either the Heating or Cooling Logic routines, either of which are executed in indefinite loops awaiting an interrupt call.

Figure 10A:
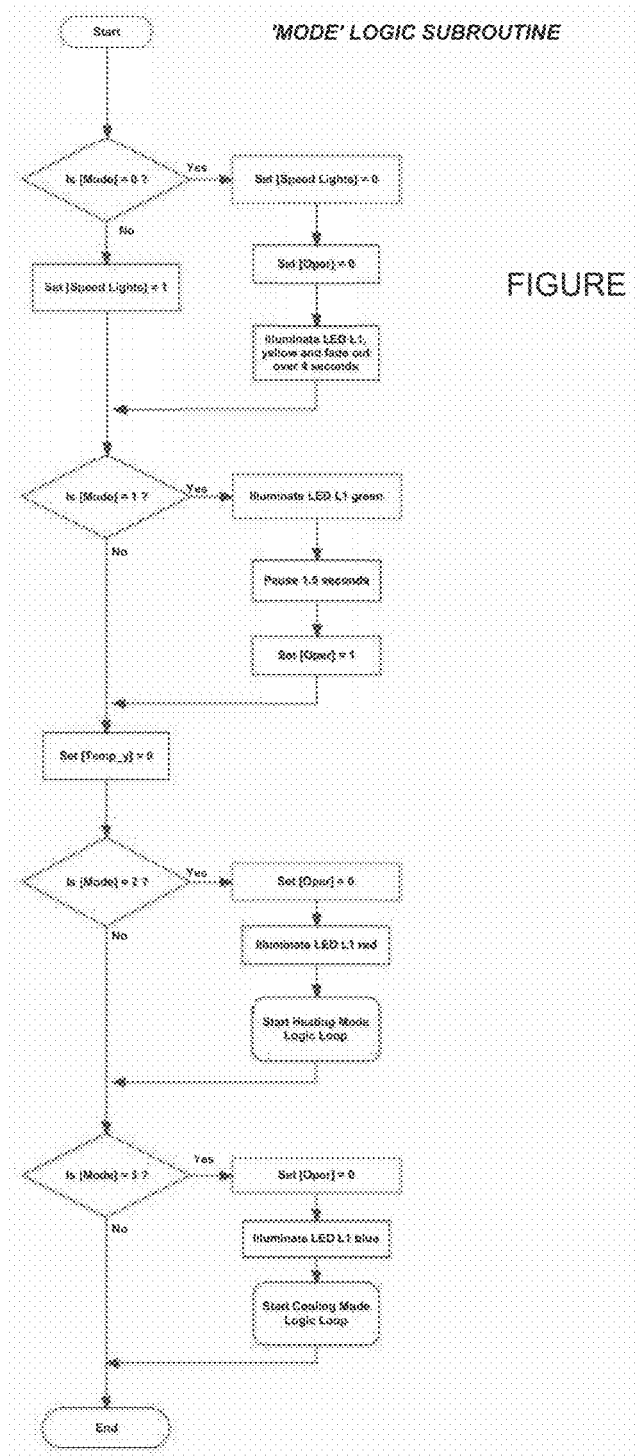
FIG. 10A shows a top portion of a mode logic subroutine logic flow diagram.
Figure 10B:
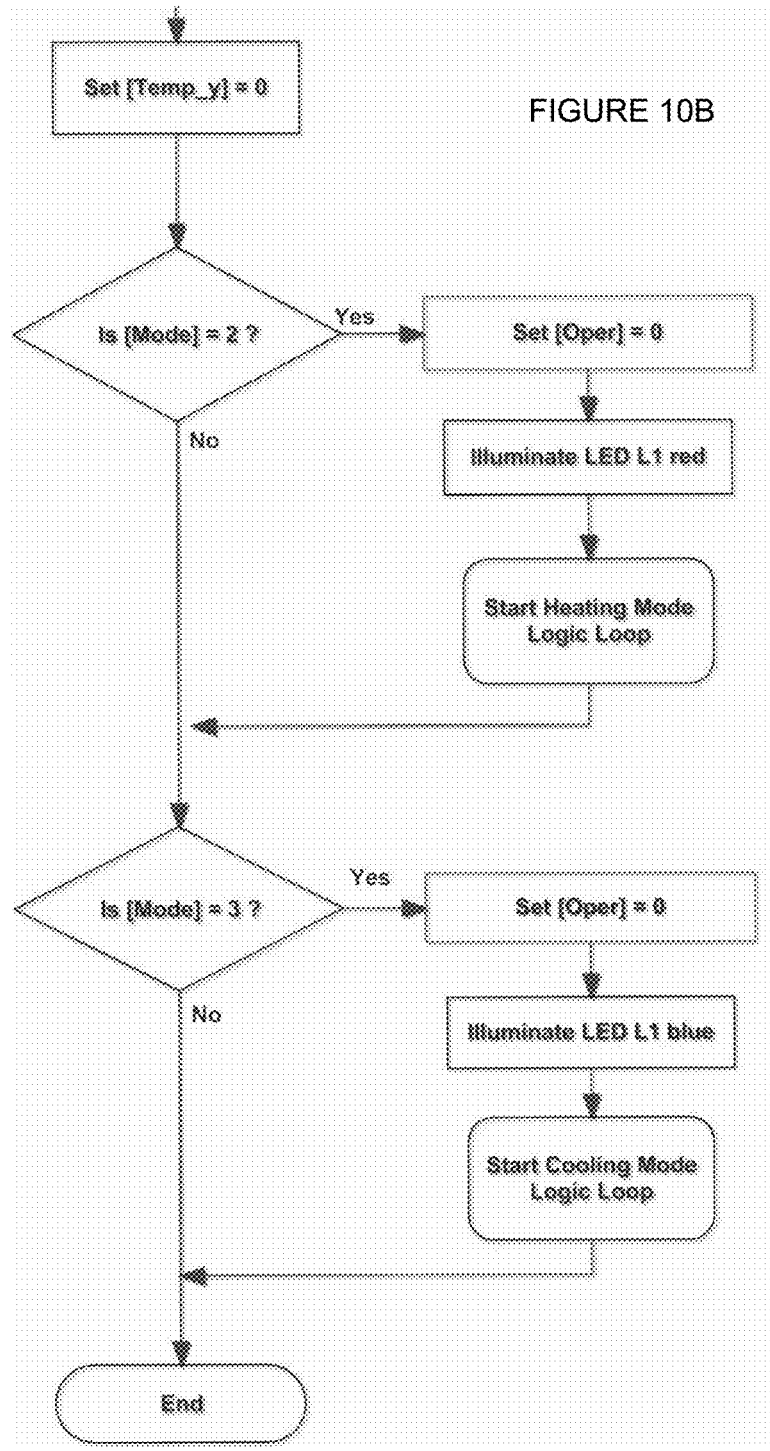
FIG. 10B shows a bottom portion of a mode logic subroutine logic flow diagram.

FIG. 10 shows the Mode Logic Subroutine for the first embodiment of this invention. It is called either by a Mode Button Press Subroute or the Main Routine during initialization. This subroutine sets the operational status of the unit. If the [Mode] value is 0, this represents "off". The [Speed Lights] parameter will be set to 0 to disable indication of the selected fan speed. The [Oper] parameter is set to 0 to turn the fan(s) off. The LED associated with "off" is lit, but then fades out over a 4 second interval. It is not only unnecessary to indefinitely indicate to the end-user that their unit is off, but it is wasteful in terms of energy consumption and also a nuisance to some. It is only necessary to give the end-user feedback that their selection of "off" is confirmed. So this only requires a momentary indication. If the [Mode] value is >0, then the [Speed Lights] parameter should be set to 1 so that the fan speed indication is enabled. This handling of the [Speed Lights] parameter in this subroutine may seem redundant since the Main Routine also performs this same evaluation of [Mode] to determine the visibility of the speed light indication. This is only true in the instance that the unit is first powered on. Otherwise, the unit is operating in one indefinite loop or another. So it is necessary to handle the speed light visibility in this subroutine when it is called from the Mode Button Press interrupt, should the [Mode] be set to 0 immediately preceding this event. If the [Mode] value is 1, this represents "on" or continuous fan operation. The corresponding LED for this mode should be lit and the [Oper] value should be set to 1 to run the fan(s). A 1.5 second pause is inserted after the [Mode] value of 1 is selected prior to starting the fan(s). In the event that the end-user is quickly iterating through the modes to land on "heating" or "cooling mode," then we do not want the fans to momentarily start and stop as they iterate past the "on" mode. Depending on the thermistor's sensitivity to airflow relative to its resistance, this momentary activation of the booster fan(s) could adversely influence the thermistor reading and, as such, lead to errors in the "heating" or "cooling" mode logic. If the [Mode] value is >1, then the [Temp_y] value should be set to 0 to initialize it such that the early stages of "heating" or "cooling" mode logic can precondition the logic for initial setpoint temperature settings. Having this '[Temp_y]=0' clause immediately preceding the temperature-dependent operating modes also allows the user to effectively reset their temperature selection by iterating through the modes. If the [Mode] value is =2, then "heating" mode is selected. The corresponding LED is lit and the [Oper] value is set to 0 so that, in conjunction with the earlier '[Temp_y]=0' clause, "heat" mode is properly initialized prior to starting the logic. The Heating Mode Logic Loop is then called. As the name implies, this subroutine will run in a continuous loop until an interrupt event occurs. Due to this, the remainder of the Mode Logic Subroutine is not executed. Finally, if the [Mode] value is =3, then "cooling" mode is selected. The corresponding LED is lit and the [Oper] variable is initialized as it was with the prior mode. The Cooling Mode Logic Loop is then called. This subroutine would never reach the end of its execution since the cooling logic also operates in a continuous loop until an interrupt event occurs.

Figure 13A:
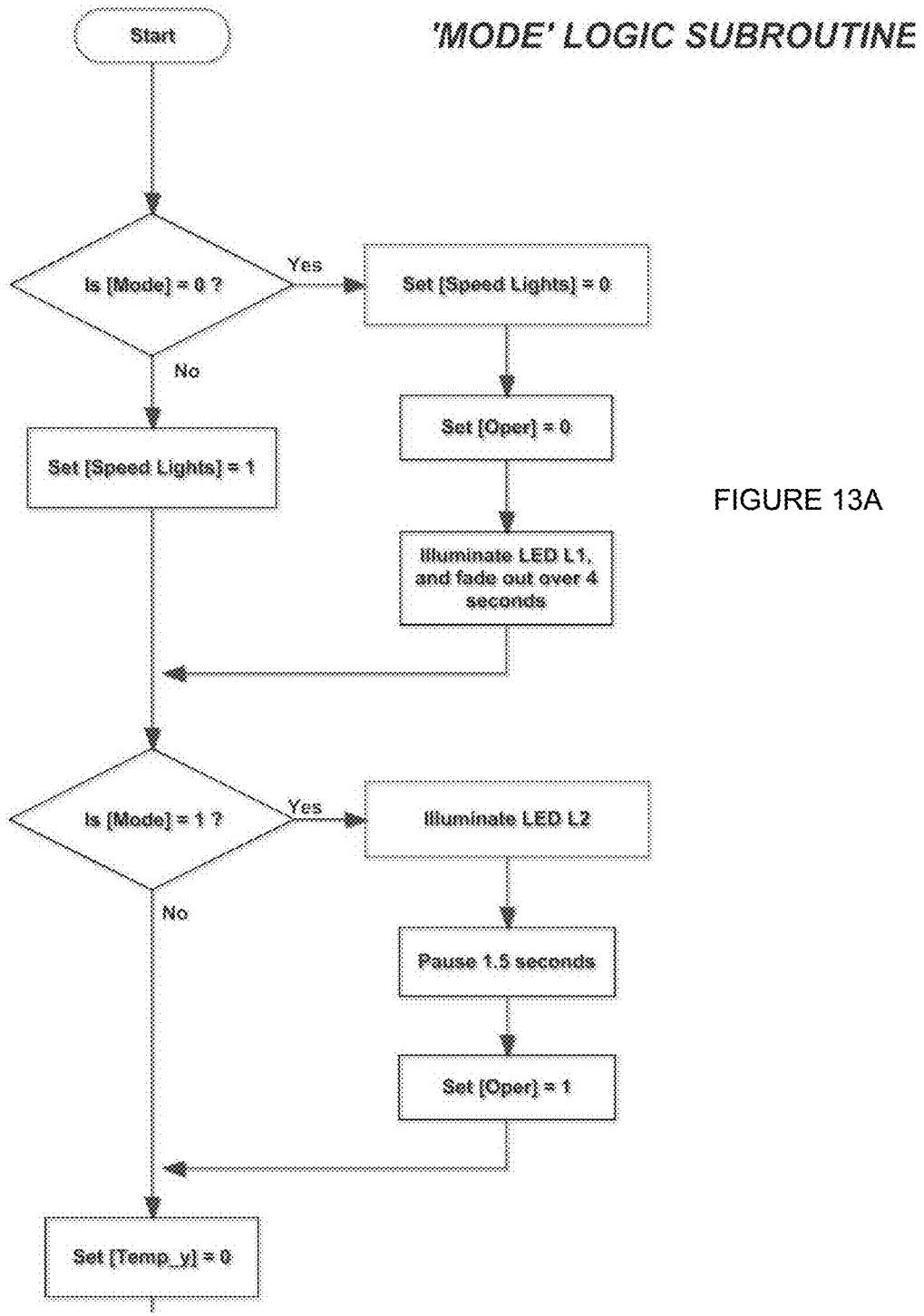
FIG. 13A shows a top portion of a mode logic subroutine logic flow diagram of an alternate embodiment.
Figure 13B:
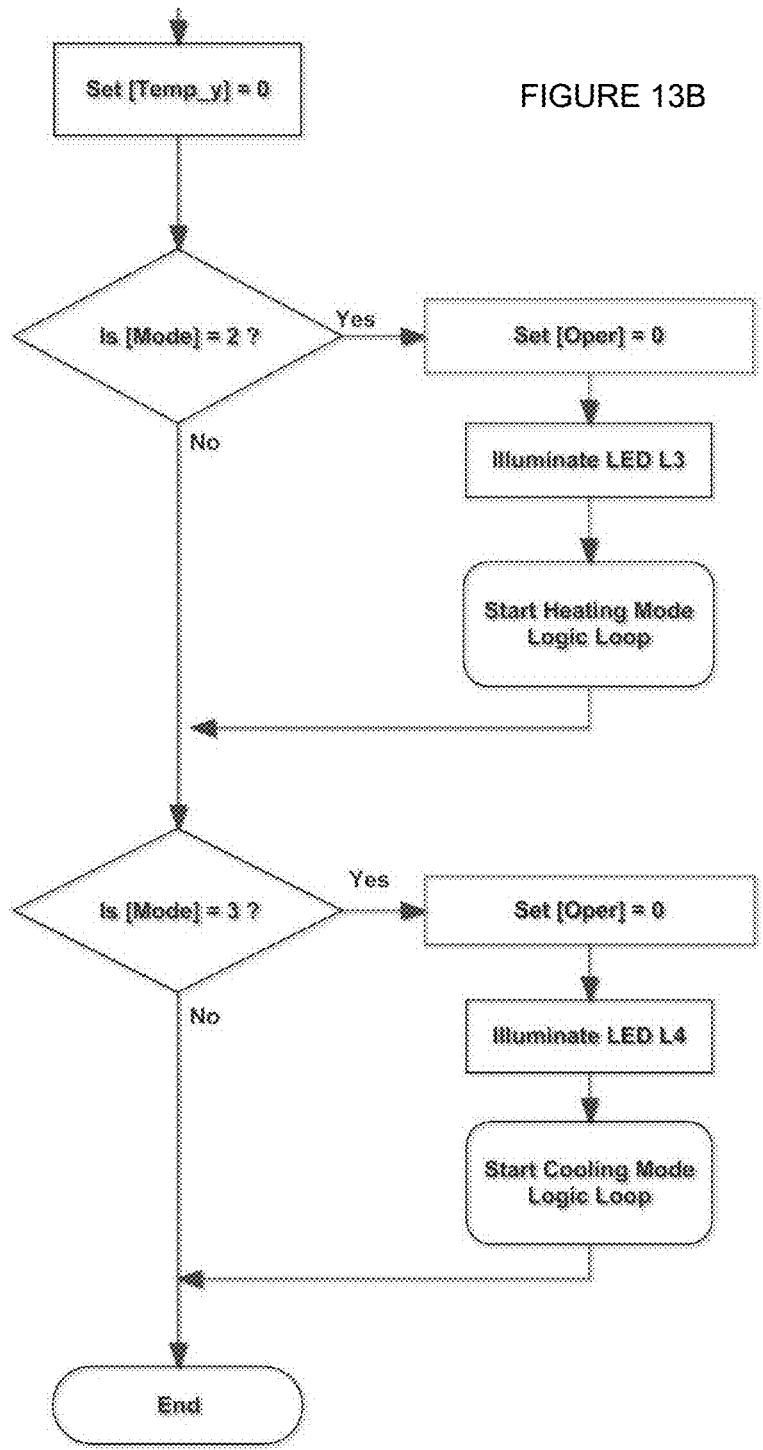
FIG. 13B shows a bottom portion of a mode logic subroutine logic flow diagram of an alternate embodiment.

FIG. 13 shows the Mode Logic Subroutine for the second embodiment of this invention. It is called by the same subroutines and itself calls the same subroutines and manages the same [Mode], [Speed Lights], [Oper], and [Temp_y] parameters as described above. It differs in the indication to the end-user. Instead of individual LED's representing each selected mode, a single RGB (red-green-blue) LED is used to indicate modes. When [Mode]=0 or "off", the LED is temporarily lit yellow, then faded out over a 4 second interval. Yellow can be produced by lighting the red and green sections of the RGB LED in sequence and balancing the colors through modulating the pulse length and thereby current consumption of each red and green element. When [Mode]=1 or "on", the LED is lit green. When [Mode]=2 or "heating", the LED is lit red. And when [Mode]=3 or "cooling", the LED is lit blue.

FIGS. 4 and 5 apply to both embodiments of this invention and are themselves what is claimed in this invention as proprietary.

FIG. 4 shows the Heating Mode Logic. The logic runs in a loop with a 6 second pause at the beginning of each cycle. Before the pause, the [Temp_y] is evaluated. Just before the Heating Mode Logic is called from the Mode Logic Subroutine, [Temp_y] is set to 0 as a flag for this logic loop to make additional initializations. If [Temp_y]=0, the logic will set [Temp_y] to a value representing the minimum setpoint knob temperature minus a [width]. This will ensure that no matter what position the setpoint knob is placed, a conditional evaluation later in the logic will automatically be true. This serves to 'reset' the logic at the beginning of the cycle. In subsequent cycles, [Temp_y] will always carry a value >0, so this initialization will be ignored. After the 6 second delay, the microcontroller will now read the thermistor temperature and setpoint setting. The instantaneous thermistor temperature is stored in the variable [Temp_x]. The instantaneous temperature setpoint setting is stored in the variable [Setpoint]. In subsequent cycles, both [Temp_x] and [Setpoint] will be overwritten with every new iteration of the loop. Next, the state of the [Oper] variable is evaluated. The logic will evaluate [Temp_x], [Setpoint], and [Temp_y] differently depending the state of the [Oper] variable, that is to say the state of the booster fan(s).

First, we will examine the logic behavior in the non-operating region or [Oper]=0. If [Oper]=0, then the logic will first examine if the [Temp_x] value is >[Setpoint] or in layman's terms, whether or not the sensed thermistor temperature has risen above the setpoint. If not, then the logic will next evaluate the [Temp_x] relative to [Temp_y]. If [Temp_x]<[Temp_y], then [Temp_y] will be overwritten with the value of [Temp_x]. If instead, [Temp_x]>[Temp_y], the value of [Temp_y] will persist throughout the next cycle. This is to say that in the non-operating region, when the instantaneous temperature is less than the stored temperature from the previous cycle, the stored temperature should follow the instantaneous temperature downwards. [Temp_y] will eventually come to represent the peak minimum temperature measured by the thermistor during the non-operating region. Now referring back to the first evaluation in the non-operating region, if the value of [Temp_x] is higher than the [Setpoint] value, then there is one more evaluation to make before enabling the fan(s). If [Temp_y] or the minimum peak temperature is less than the current value of [Setpoint]−[Width], then the [Oper] variable will be set to 1 to enable the operation of the fan(s). If this is the first time the previous '[Temp_x]>[Setpoint]' clause has been true since entering "heating mode", this clause will also necessarily be true since [Temp_y] was preconditioned to be an artificially low value. If this is a subsequent furnace cycle, then this clause is a safeguard against a false positive trigger event if the previous clause is evaluated immediately after the fan(s) stop from the 'deviation from peak temperature' clause in the operating region. After a 6 second delay, [Temp_y] will no longer be held and instead is overwritten with the value of [Temp_x] to pre-condition [Temp_y] for its treatment in the operating region of the next cycle. [Temp_y] will no longer serve as a sample-and-hold stored variable representing minimum peak temperature. Both of these evaluations must be true in order to enable the fan operation. The 6 second pause after enabling the fan operation, but before setting [Temp_y]=[Temp_x], is necessary to help reduce the effects of airflow over the thermistor. Some thermistors respond to a sudden increase in airflow with a positive shift in resistance. [Temp_x] was of course sampled and stored prior to this delay and shift in resistance, but this delay stacked on top of the loop's 6 second delay gives the thermistor enough time to stabilize before it is sampled again and compared to the [Setpoint] and/or [Temp_y] in the operating region of the logic.

Next, we will examine the operating region of the logic or [Oper]=1. The first clause examines the instantaneous thermistor temperature relative to the setpoint. If [Temp_x] <([Setpoint]−([Width]/2)), then the fan(s) should stop by setting [Oper] to a value of 0. This is the clause that will fail if the thermistor's sudden shift in resistance upon the start of the booster's fan(s) isn't effectively mitigated. The temperature must fall below the setpoint by an additional amount as defined by ([Width]/2). This imparts some deadband or hysteresis about the setpoint for stability, but only in the negative region (below the setpoint). This clause is typically not the primary action that will stop the operation of the fan(s) at the end of the furnace cycle. But it exists as a safeguard in cases where the primary method fails. The next clause evaluates the instantaneous temperature relative to the peak temperature. This is the primary method of stopping the fan operation when the furnace cycle ends. If [Temp_x]<([Temp_y]−[Width]), then the fan(s) should stop by setting [Oper] to a value of 0. Once the furnace cycle reaches peak temperature (detected by the treatment of [Temp_y] in the next clause) and begins to drop as the furnace ceases to provide heat to the duct system, the unit will stop the fan(s) once the temperature has dropped from the peak by a fixed amount. At the moment the temperature has dropped by a fixed amount from peak and the fan(s) turn off, the thermistor temperature and thus the [Temp_x] value recorded in the next logical cycle will naturally be higher than the [Setpoint] value. This condition is prevented from reactivating the fan(s) by the 'Is [Temp_y]<([Setpoint]−[Width])' clause in the non-operating region. If neither of the two previous clauses in the operating region find cause to turn the fan(s) off, then there is one more evaluation to make. The logic will again evaluate the value of [Temp_x] relative to [Temp_y], but in the opposite manner as described in the non-operating region. If the instantaneous thermistor temperature or [Temp_x] is > the stored temperature from the previous cycle or [Temp_y], then [Temp_y] will be overwritten with this new higher value of [Temp_x]. If [Temp_x] <[Temp_y], then the value of [Temp_y] will persist. We once again have a sample-and-hold peak detection scheme but in this case, the [Temp_y] variable will represent the maximum recorded temperature during the furnace cycle. In other words, [Temp_y] will follow [Temp_x] upwards, but retain the peak temperature value if [Temp_x] is falling in the operating region of the logic. The delay and preconditioning of [Temp_y] that immediately follow the end of the fan cycle or [Oper]=0 is implemented in the operating region for the same reasons it is implemented in the non-operating region described above.

FIG. 5 shows the Cooling Mode Logic. Its logical structure is identical to the Heating Mode Logic, but the evaluations of each temperature-dependent variable are reversed in sign and scope.

Code Implementation of Heating and Cooling Mode Logic

Table 1 below shows the implementation of the Heating Mode Logic and Cooling Mode Logic in programmatic form. This code is intended for a c complier. Additional code is required depending on the microcontroller chosen for the task, but is omitted here for clarity. Note that all of the signage in the code is reversed compared to the flow diagrams. The flow diagrams are referring to temperature values. But the code is referring to the voltage read on the pins sampling the thermistor and setpoint. Since the NTC thermistor will show a positive shift in value as the temperature falls, all of the evaluations must be inverted with respect to the flow diagrams.

TABLE 1

```
CODE SNIPS (BEGIN)
void HeatModeLogic (void)
{
  Float lower_enable;
  Float upper_threshold;
  Float max_deviation;
  If (temp_y == 0)
  {
    temp_y = min_dial_temp + width;
  }
  while (1)
  {
    Delay(6);
    temp_x = GetTemp( );
    setpoint = GetSetpoint( );
    lower_enable = setpoint + width;
    upper_threshold = setpoint + (width / 2);
    max_deviation = temp_y + width;
    If (oper == 1)
    {
      If (temp_x > upper_threshold)
      {
        oper = 0;
        Delay(6);
        temp_y = temp_x;
      }
      else
      {
        If (temp_x > max_deviation)
        {
          oper = 0;
```

TABLE 1-continued

```
            Delay(6);
            temp_y = temp_x;
         }
      }
      If (oper != 0)
      {
         If (temp_x < temp_y)
         {
            temp_y = temp_x;
         }
      }
      else
      {
         If (temp_x < setpoint)
         {
            If (temp_y > lower_enable)
            {
               oper = 1;
               Delay(6);
               temp_y = temp_x;
            }
         }
         If (oper != 1)
         {
            If (temp_x > temp_y)
            {
               temp_y = temp_x;
            }
         }
      }
   }
   return;
}
void CoolModeLogic (void)
{
   Float upper_enable;
   Float lower_threshold;
   Float min_deviation;
   If (temp_y == 0)
   {
      temp_y = max_dial_temp - width;
   }
   while (1)
   {
      Delay(6);
      temp_x = GetTemp ( );
      setpoint = GetSetpoint( );
      upper_enable = setpoint - width;
      lower_threshold = setpoint - (width / 2);
      min_deviation = temp_y - width;
      If (oper == 1)
      {
         If (temp_x < lower_threshold)
         {
            oper = 0;
            Delay(6);
            temp_y = temp_x;
         }
         else
         {
            If (temp_x < min_deviation)
            {
               oper = 0;
               Delay(6);
               temp_y = temp_x;
            }
         }
         If (oper != 0)
         {
            If (temp_x > temp_y)
            {
               temp_y = temp_x;
            }
         }
      }
      else
      {
         If (temp_x > setpoint)
         {
            If (temp_y < upper_enable)
            {
               oper = 1;
               Delay(6);
               temp_y = temp_x;
            }
         }
         If (oper != 1)
         {
            If (temp_x < temp_y)
            {
               temp_y = temp_x;
            }
         }
      }
   }
   return;
}
```

TABLE 1 CODE SNIPS (END)

Graphical Example of a Furnace Cycle

Figure 14:
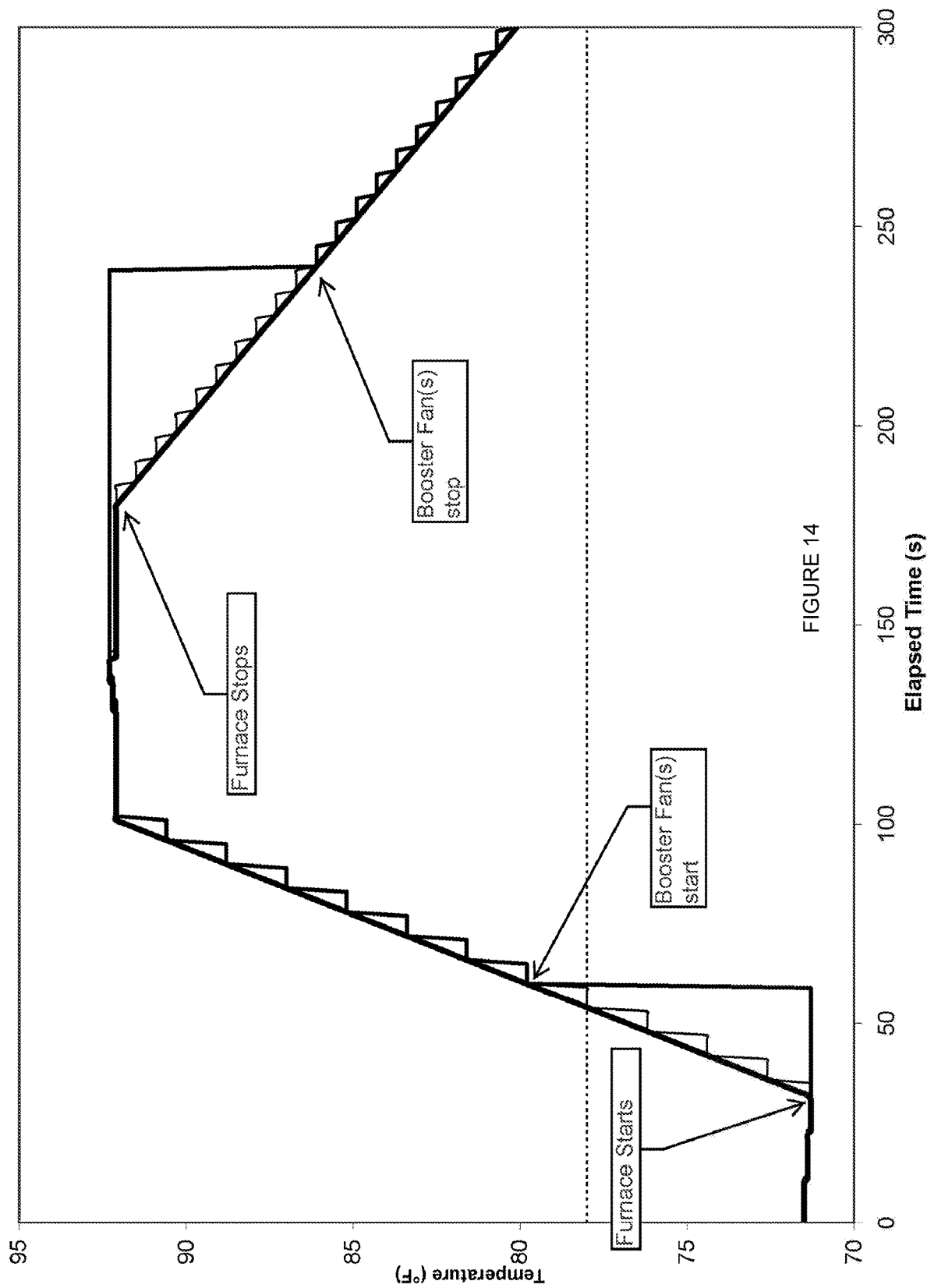
FIG. 14 shows an example furnace cycle graphed in a temperature vs elapsed time format.

FIG. 14 shows an example furnace cycle graphed in a temperature vs elapsed time format. It illustrates the conditional sample and hold behavior of the [Temp_y] variable during the operational and non-operational modes as well as the transitions thereof.

The precise implementation of the present invention will vary depending upon the particular application.

It is thought that the method and apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred and/or exemplary embodiment thereof.

I claim:

1. A method of improving operation of HVAC system, comprising the steps of:
   providing an air temperature changing system;
   coupling a duct to said air temperature changing system;
   said duct having an input end and an output end;
   providing at said output end, an electric fan for causing air to move more quickly out of said output end;
   providing a temperature sensor for sensing a temperature characteristic of air in said duct; and
   wherein said electric fan is configured to turn off in response to a determination that a predetermined magnitude of a width of a deviation has occurred between a current temperature characteristic of air in said duct and one of a maximum stored temperature characteristic and a minimum stored temperature characteristic of air in said duct.

2. The method of claim 1 wherein said air temperature changing system comprises an air conditioner.

3. The method of claim 1 wherein said electric fan is disposed at least partially inside of said duct.

4. The method of claim 1 wherein said air temperature changing system comprises an air handler and wherein said one of a maximum stored temperature characteristic and a minimum stored temperature characteristic is said maximum stored temperature characteristic.

5. The method of claim 4 where the width is programmed into a microcontroller unit.

6. The method of claim 5 where the width is not adjustably programmable by an end user of said electric fan.

7. The method of claim 6 wherein the width is programmed to be 4° F.

8. A system for changing a flow rate of air out of a duct, the system comprising:
- an air temperature changing system;
- a duct having an input end and an output end, where said input end is coupled to said air temperature changing system;
- an electric fan coupled to said output end;
- wherein said electric fan is configured to stop powered operation if the following event has occurred: and
- a predetermined magnitude of deviation has occurred between a current temperature characteristic of air in said duct and one of a maximum stored temperature characteristic and a minimum stored temperature characteristic of air in said duct.

9. The system of claim 8 wherein said air temperature changing system is an air conditioner and said one of a maximum stored temperature characteristic and a minimum stored temperature characteristic is said minimum stored temperature characteristic.

10. The system of claim 8 wherein said air temperature changing system comprises a heating element.

11. The system of claim 10 wherein the width is not adjustable by changing a voltage applied to a single pin on a microcontroller unit.

12. A HVAC system comprising:
- a means for improving operation of HVAC system, comprising:
  - an air temperature changing system;
  - a duct coupled to said air temperature changing system; said duct having an input end and an output end;
  - a means for causing air to move more quickly out of said output end;
  - a means for sensing a temperature characteristic of air in said duct; and
  - wherein said means for causing air to move more quickly is configured to turn off in response to a determination that a predetermined magnitude of deviation has occurred between a current temperature characteristic of air in said duct and one of a maximum stored temperature characteristic and a minimum stored temperature characteristic of air in said duct.

13. The HVAC system of claim 12 wherein said air temperature changing system comprises an air conditioner.

14. The HVAC system of claim 12 wherein said means for causing air to move more quickly is disposed at least partially inside of said duct.

15. The HVAC system of claim 12 wherein said air temperature changing system comprises a furnace and wherein said one of a maximum stored temperature characteristic and a minimum stored temperature characteristic is said maximum stored temperature characteristic.

16. The HVAC system of claim 15 where the width is programmed into a microcontroller unit.

17. The HVAC system of claim 16 where the width is not adjustably programmable by an end user of said means for causing air to move more quickly.

18. The HVAC system of claim 17 wherein the width is programmed to be 6° F.

* * * * *